United States Patent Office 3,399,335
Patented Aug. 27, 1968

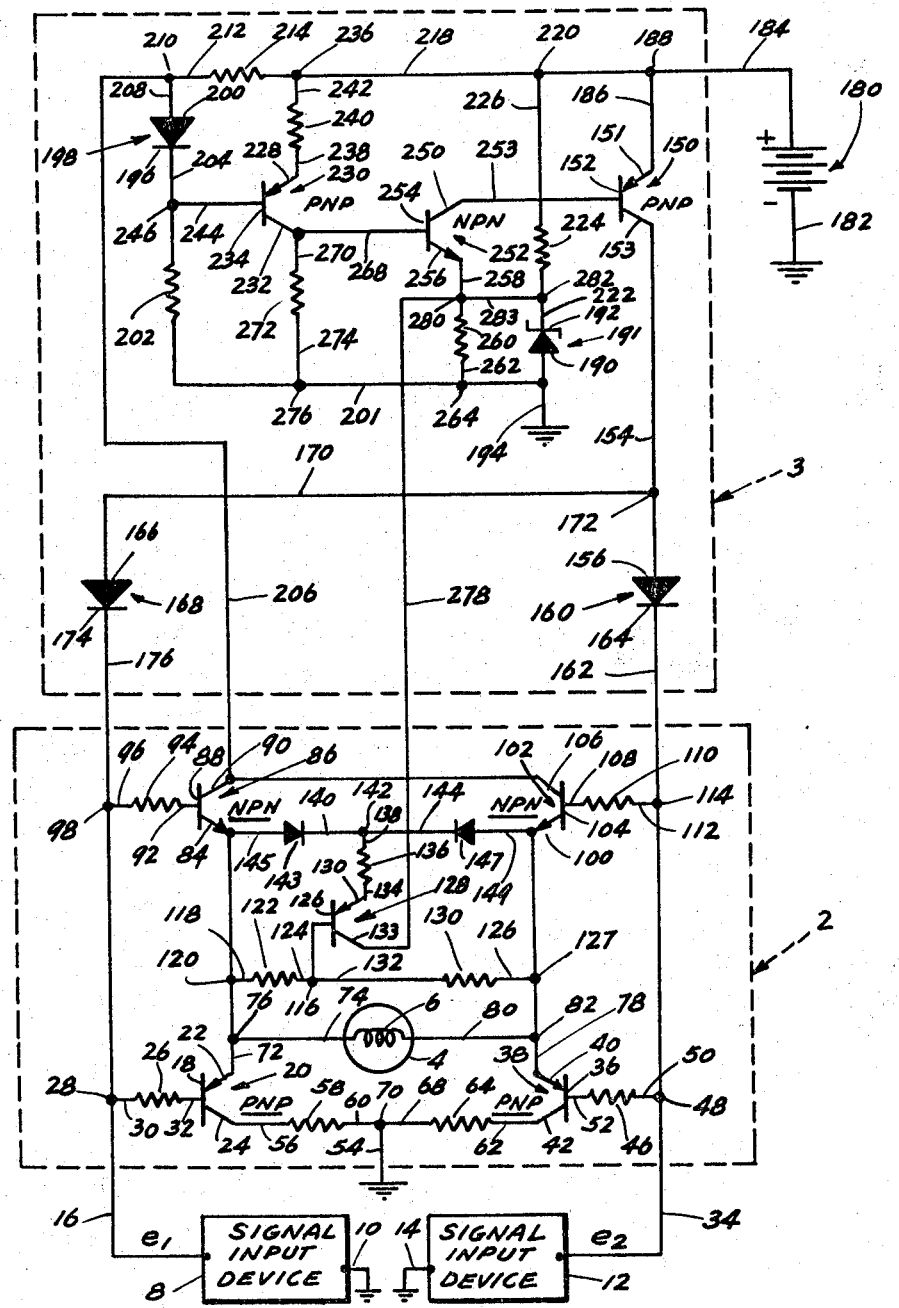

3,399,335
LOAD CURRENT AND POWER DISSIPATION
LIMITER FOR A DIRECT COUPLED AMPLI-
FIER FED MOTOR SYSTEM
Frank Prapis, Paterson, and Charles P. Cacioppo, Param-
us, N.J., assignors to The Bendix Corporation, a cor-
poration of Delaware
Filed Nov. 26, 1965, Ser. No. 509,965
6 Claims. (Cl. 318—434)

The invention described herein was made in the per-
formance of work under a NASA contract and is sub-
ject to the provisions of section 305 of the National
Aeronautics and Space Act of 1958, Public Law 85–568
(72 Stat. 435; 42 U.S.C. 2457).

This invention relates to a load current and power
dissipation limiter for a direct coupled amplifier, and
more particularly to an electronic control network for
limiting the maximum load current applied to an am-
plifier driven motor as a function of the load voltage.

A major consideration in the design of an amplifier
used for driving a direct current motor is maintaining mo-
tor current and power dissipation within tolerable limits
under load variations and/or component failures. A
device for accomplishing this by limiting the load cur-
rent to a predetermined value is described and broadly
claimed in co-pending U.S. application Ser. No. 405,711,
filed on Oct. 22, 1964, by Frank Prapis and Joseph A.
Zubchalski, and assigned to The Bendix Corporation, as-
signee of the present invention.

However, extreme conditions may exist where the load
resistance is minimum or zero due to load characteristics
or a component malfunction. In such an instance, the
maximum power developed must be absorbed and dis-
sipated. Similarly, when the motor is driven by a bridge
type, transistorized amplifier, a collector to emitter short
can also cause excessive power dissipation.

An object of this invention is to provide circuitry
which monitors the load voltage and adjusts the current
limit to the motor as a function of the load voltage.

Another object of this invention is to provide, in a
differential type direct coupled amplifier for driving a
motor, a direct current monitor for monitoring the load
voltage to the motor, and electronic circuitry to limit the
current to the motor as a function of load voltage.

Another object of this invention is to provide, in a
differential type direct current amplifier for driving a
motor, a current limiter for sensing voltage proportional
to the load current to the motor to provide a control
voltage opposing a rise in the load current above a pre-
determined value, and having an adjustable threshold
to change the predetermined value as a function of the
load voltage.

The present invention contemplates a current limiter
for a direct coupled differential input amplifier used for
driving a motor. The limiter includes first means for
limiting the load current supplied by the amplifier to a
predetermined value; second means for providing a mini-
mum predetermined load current value; third means for
sensing the load voltage across the motor winding and
for providing a proportional output current; fourth
means responsive to the output current for changing the
predetermined value of load current, and fifth means
for providing a maximum predetermined current value.

These and other objects and features of the invention
are pointed out in the following description in terms of
the embodiment thereof which is shown in the accom-
panying drawing. It is to be understood, however, that
the drawing is for the purpose of illustration only and
is not a definition of the limits of the invention, refer-
ence being had to the appended claims for this purpose.

The single figure in the drawing is a schematic wiring diagram of a differential type direct coupled am-
plifier including novel current limiting circuitry in ac-
cordance with the present invention.

In reference to the figure, a bridge type output am-
plifier, designated generally by the numeral 2, is shown
coupled to a driven motor 4 having a winding 6. A
current limiting amplifier 3 is connected to an output of
amplifier 2.

Amplifier 2 is of a conventional type having an input
$e_1$ provided by a signal input device 8 which is connected
to a grounded conductor 10, and an input $e_2$ provided by
a signal input device 12 connected to a grounded con-
ductor 14. Generally $e_1$ is more positive than $e_2$, thus
providing a differential input to amplifier 2.

An output conductor 16 of signal input device 8 is con-
nected to a base 18 of a PNP transistor 20 having an
emitter 22 and a collector 24 through a conductor 30
joining conductor 16 at a point 28, a resistor 26, and a
conductor 32.

An output conductor 34 of signal input device 12 is
connected to a base 36 of a PNP transistor 38 having an
emitter 40 and a collector 42 through a conductor 50
joining conductor 34 at a point 48, a resistor 46 and a
conductor 52. Collector 24 of transistor 20 and collector
42 of transistor 36 are connected to a grounded con-
ductor 54 through a conductor 56, a resistor 58 and a
conductor 60, and a conductor 62, a resistor 64 and a
conductor 68, respectively, with conductors 60 and 68
joining grounded conductor 54 at a point 70. Emitter
22 of transistor 20 is connected to winding 6 of motor
4 through a conductor 72 and a conductor 74 joining con-
ductor 72 at a point 76. Emitter 40 of transistor 38 is
connected to winding 6 of motor 4 through a conductor
78 and a conductor 80 joining conductor 78 at a point 82.

Emitter 22 of transistor 20 is connected through con-
ductor 72 to an emitter 84 of an NPN transistor 86 hav-
ing a base 88 and a collector 90, with base 88 of transistor
86 connected to output conductor 16 of signal input de-
vice 8 through a conductor 92, a resistor 94 and a con-
ductor 96 joining conductor 16 at a point 98.

Emitter 40 of transistor 38 is connected through con-
nector 78 to an emitter 100 of an NPN transistor 102
having a base 104 and a collector 106, with base 104 of
transistor 102 connected to output conductor 34 of signal
input device 12 through a conductor 108, a resistor 110
and a conductor 112 joining conductor 34 at a point 114.

Emitter 22 of transistor 20 and emitter 40 of transistor
38 are joined at a point 116 through conductor 72, a con-
ductor 118 joining conductor 72 at a point 120, a resistor
122 and a conductor 124, and conductor 78, a conductor
126 joining conductor 78 at a point 127, a resistor 130
and a conductor 132, respectively. The output at point
116 is connected to a base 126 of a PNP transistor 128
having an emitter 130 and a collector 133.

Emitter 130 of transistor 128 is connected to emitter
84 of transistor 86 through a conductor 134, a resistor
136, a conductor 138 joining a conductor 140 at a point
142, a diode 143 and a conductor 145. Emitter 130 is
further connected to emitter 100 of transistor 102
through conductor 134, resistor 136, conductor 138 join-
ing a conductor 144 at point 142, a diode 147 and a con-
ductor 149.

A PNP transistor 150, in current limit amplifier 3,
having an emitter 151, a base 152, and a collector 153, is
connected at collector 153 to output conductor 34 of
signal input device 12 at point 114 through a conductor
154 connected to an anode 156 of a diode 160, and a con-
ductor 162 connected to a cathode 164 of diode 160. Col-
lector 153 of transistor 150 is connected to output con-
ductor 16 of signal input device 8 at a point 98 through
a conductor 170 joining conductor 154 at a point 172

3 and connected to an anode 166 of a diode 168, and a conductor 176 connected to a cathode 174 of diode 168.

A direct current biasing supply 180 has a negative terminal connected to a grounded conductor 182 and a positive terminal connected to emitter 151 of transistor 150 through a conductor 184 and a conductor 186 joining conductor 184 at a point 188.

An anode 190 of a Zener diode 191 having a cathode 192 is connected to a grounded conductor 194 and to a cathode 196 of a diode 198 having an anode 200 through a conductor 201, a resistor 202 and a conductor 204. Collector 90 of transistor 86 is connected to an anode 200 of diode 198 through a conductor 206 and a conductor 208 joining conductor 206 at a point 210. The output at point 210 is connected to emitter 151 of transistor 150 through a conductor 212, a resistor 214 and a conductor 218 joining conductor 186 at point 188. Cathode 192 of Zener diode 191 is connected to conductor 218 at a point 220 through a conductor 222, a resistor 224 and a conductor 226.

An emitter 228 of a PNP transistor 230 having a collector 232 and a base 234 is connected to connector 218 through a conductor 238, a resistor 240 and a conductor 242 joining conductor 218 at a point 236. Base 234 of transistor 230 is connected to cathode 196 of diode 198 through a conductor 244 joining conductor 204 at a point 246.

Base 152 of transistor 150 is connected to a collector 250 of an NPN transistor 252 having a base 254 and an emitter 256 through a conductor 253, and emitter 256 of transistor 252 is connected to ground through a conductor 258, a resistor 260 and a conductor 262 joining conductor 201 at a point 264. Base 254 of transistor 252 is connected to collector 232 of transistor 230 through a conductor 268, and collector 232 of transistor 230 is connected to ground through a conductor 270, a resistor 272 and a conductor 274 joining conductor 201 at a point 276. Emitter 256 of transistor 252 is connected to collector 132 of transistor 128 in amplifier 2 through a conductor 278 joining conductor 258 at a point 280. Connector 278 is connected to cathode 192 of Zener diode 191 through conductor 283 joining conductor 278 at a point 280 and joining conductor 222 at point 282.

*Operation*

As heretofore noted the differential input provided by signal $e_1$ from signal input device 8, and signal $e_2$ from signal input device 12 is used to drive amplifier 2. Since signal $e_1$ is allowed to be more positive than signal $e_2$, transistors 38 and 86 are rendered operative to pass current to winding 6 of motor 4. At a predetermined current, collector 153 of transistor 150 in current limiter 3, which is connected to signal input device 12 through diode 160 and connected to signal input device 8 through diode 168, raises the lower side of the differential input potential $e_1-e_2$. The differential voltage between transistors 38 and 86 is thus raised to a value just sufficient to maintain the predetermined current.

A low current limit is initially established by the ratio of resistor 260 to resistor 224. A short in winding 6 of motor 4, for example, will cause transistors 38 and 86 to dissipate all of the input power, and the current limit established by resistors 260 and 224 keeps this power dissipation within the capabilities of transistors 38 and 86. If transistor 102 is shorted when transistors 38 and 86 are passing current to motor 4, the current provided by this short will bypass the motor load thus preventing destructive dissipation of power.

Under normal load conditions transistor 128 supplies an output at collector 133 proportional to the load voltage of motor 4. Emitter 130 of transistor 128 is connected to the higher positive potential on emitter 84 of transistor 86 or emitter 100 of transistor 102 through diodes 143 and 147, respectively. Resistors 122 and 136 apportion the voltage across winding 6 of motor 4 so as to render base 126 of transistor 128 negative with respect to emitter

4

130 of transistor 128. Resistor 136, coupling emitter 130 of transistor 128 to emitter 84 of transistor 86, and coupling emitter 130 to emitter 100 of transistor 102, renders the current and voltage on base 126 of transistor 128 proportional. The output of transistor 128, at collector 133, is connected across resistor 260 to increase the bias across resistor 260 in current limiter 3, thus increasing the current limit value of transistor 150 as the motor voltage increases. This current limit is raised above the current producing a voltage in motor 4 until Zener diode 191 is rendered conductive. At this point the maximum current limit occurs as determined by maximum load current requirements.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a load current limiter of a type including an electric motor having an energizing winding, an amplifier for supplying load current to the winding and a differential input supply for driving the amplifier, the improvement comprising:
    first means for limiting the load current supplied by the amplifier to the motor winding to a predetermined value;
    second means for providing a minimum predetermined load current value;
    third means for sensing the load voltage across the motor winding and responsive thereto for providing an output current proportional to the load voltage;
    fourth means responsive to the output current for changing the predetermined value of load current supplied by the second means; and
    fifth means for providing a maximum predetermined load current value.

2. A load current limiter as defined by claim 1 wherein, the first means comprises:
    a first current flow control device having electrodes between which a current flows and input and output current flow control elements;
    a source of constant biasing voltage connected to the input element of the current flow device to provide a predetermined current flow between the electrodes thereof; and
    the amplifier being connected to the output element of the current flow control device and responsive to the current flow between the electrodes thereof so as to provide a differential voltage to limit the load current to the predetermined value.

3. A load current limiter as defined by claim 2 wherein, the second means comprises:
    a first resistor having a predetermined value connected across the input element of the first current flow control device;
    a second resistor having a predetermined value connected across the output element of the first current flow control device; and
    the ratio of the values of the first and second resistors providing a current flow between the electrodes of the first current flow device for providing a differential voltage to maintain the load current at a minimum predetermined value.

4. A load current limiter as defined by claim 3 wherein, the third means comprises:
    a second current flow control device having electrodes between which current flows, and having an input element connected across the motor winding for sensing a current proportional to the load voltage across the winding and an output element; and
    a third resistor connecting the motor winding across the input element of the second current flow control device causing the current at the output element thereof to be proportional to the load voltage.

5. A load current limiter as defined by claim 4 wherein, the fourth means comprises:

the second resistor being connected across the output element of the second current flow control device causing a change in the bias voltage across the second resistor; and the change in bias voltage causing the ratio of the first and second resistors to change so as to change the current flow between the electrodes of the first current control flow device in proportion to the load voltage.

6. A load current limiter as defined by claim 4 wherein, the fifth means comprises:

a Zener diode connecting the second resistor across the output element of the first current flow control device; and means for providing a breakdown voltage across the Zener diode to provide a voltage in opposition to the bias voltage across the second resistor so as to prevent excessive current flow between the electrodes of the first mentioned current flow control device.

No references cited.

ORIS L. RADER, *Primary Examiner.*

G. R. SIMMONS, *Assistant Examiner.*